(12) United States Patent
Aiyama

(10) Patent No.: US 6,921,220 B2
(45) Date of Patent: Jul. 26, 2005

(54) IMAGE PROCESSING SYSTEM, DATA PROCESSING APPARATUS, DATA PROCESSING METHOD, COMPUTER PROGRAM AND STORAGE MEDIUM

(75) Inventor: Kenji Aiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 10/017,096

(22) Filed: Dec. 13, 2001

(65) Prior Publication Data

US 2002/0076245 A1 Jun. 20, 2002

(30) Foreign Application Priority Data

Dec. 19, 2000 (JP) ........................................ 2000-385856

(51) Int. Cl.[7] .......................... B41J 11/44; B41F 23/04; G06K 15/00
(52) U.S. Cl. ......................... 400/76; 101/487; 101/494; 101/488; 101/483; 101/248; 358/1.15; 358/1.16
(58) Field of Search ............................ 400/76; 101/487, 101/494, 488, 483, 248; 358/1.15, 1.16, 1.8, 296; 709/208, 203

(56) References Cited

U.S. PATENT DOCUMENTS

| | | | | | |
|---|---|---|---|---|---|
| 4,839,829 | A | * | 6/1989 | Freedman | 345/751 |
| 5,287,194 | A | * | 2/1994 | Lobiondo | 358/296 |
| 5,826,244 | A | * | 10/1998 | Huberman | 705/37 |
| 5,850,584 | A | * | 12/1998 | Robinson et al. | 399/79 |
| 6,078,906 | A | * | 6/2000 | Huberman | 705/37 |
| 6,101,484 | A | * | 8/2000 | Halbert et al. | 705/26 |
| 6,418,462 | B1 | * | 7/2002 | Xu | 709/201 |
| 6,535,294 | B1 | * | 3/2003 | Arledge et al. | 358/1.15 |
| 2002/0063887 | A1 | * | 5/2002 | White | 358/1.15 |
| 2002/0073003 | A1 | * | 6/2002 | Levine | 705/30 |

FOREIGN PATENT DOCUMENTS

| | | |
|---|---|---|
| JP | 9-114907 | 5/1997 |
| JP | 2000-81959 | 3/2000 |

* cited by examiner

*Primary Examiner*—Daniel J. Colilla
*Assistant Examiner*—Wasseem H. Hamdan
(74) *Attorney, Agent, or Firm*—Fitzpatrick, Cella, Harper & Scinto

(57) ABSTRACT

An image processing system wherein a data processing apparatus and a plurality of image processing apparatuses are connected through a network. The data processing apparatus transmits a print job that is received through the network from a client and first instruction data that instructs to calculate a printing cost for the print job to each of the plurality of image processing apparatuses, and receives response data with respect to the transmission from each of the plurality of image processing apparatuses, and selects one of the plurality of image processing apparatuses based on a plurality of response data received. The image processing apparatus responds to reception of the print job and the first instruction data from the data processing apparatus, calculates a printing cost based on an image processing capability of the apparatus itself, and transmits the print cost calculated to the data processing apparatus.

26 Claims, 3 Drawing Sheets

IMAGE PROCESSING SYSTEM, DATA
PROCESSING APPARATUS, DATA
PROCESSING METHOD, COMPUTER
PROGRAM AND STORAGE MEDIUM

BACKGROUND OF THE INVENTION

1. Field of the Invention

The present invention relates to an image processing system that enables the user who uses an image processing service to select among a plurality of image processing service providers a provider who provides the image processing service at the lowest image processing cost and to request the service.

2. Description of the Related Art

In the past, Japanese laid-open patent application HEI 9-114907 describes a technique that is designed for a system that enables a selection, among a plurality of image processing service providers, of the most preferable image processing service provider and a request for an image processing service.

By constructing an image processing service intermediary system that mediates between a plurality of image processing service users and a plurality of image processing service providers as in the case of the above technique, there is an advantage in that the image processing service users can select among many image processing service providers the most preferable image processing service provider, and there is also an advantage in that the image processing service providers can obtain many customers.

However, in the conventional technique, each of the image processing service providers makes an estimate based on data for the number of prints, the size of paper, and the type of paper without using data for printing. Accordingly, it is difficult to accurately calculate the cost that would incur at the time of actual printing, and this inaccurate cost estimate would likely become disadvantageous to either the image processing service users or the image processing service providers.

SUMMARY OF THE INVENTION

The present invention is provided to solve the problems of the conventional technology described above, and it is an object of the present invention to provide an image processing system that can accurately calculate each image processing cost of at least one or more image processing service providers, and enables the user to readily select an image processing service provider advantageous to the user.

To achieve the above object, an image processing system in accordance with the present invention comprises a data processing apparatus and a plurality of image processing apparatuses that are connected to one another through a network, wherein the data processing apparatus is equipped with:

a transmitter that transmits a print job that is received through the network and first instruction data that instructs to calculate a printing cost for the print job to each of the plurality of image processing apparatuses;

a receiver that receives response data with respect to the transmission by the first transmitter from each of the plurality of image processing apparatuses; and a selector that selects one of the plurality of image processing apparatuses based on a plurality of response data received by the receiver.

The image processing apparatus, being responsive to reception of the print job and the first instruction data from the data processing apparatus, calculates a printing cost based on an image processing capability of the apparatus itself and transmits the print cost calculated to the data processing apparatus.

Also, to achieve the above object, a data processing apparatus in accordance with the present invention is equipped with:

an analyzer that analyzes a print job received through a network;

a manager that manages cost data indicative of costs required for forming images by a plurality of image processing apparatuses connected through the network; and a selector that selects one of the plurality of image processing apparatuses based on a result provided by the analyzer and the cost data managed by the manager.

Other objects and features of the present invention shall become apparent from the specification and drawings below.

Figure 1:
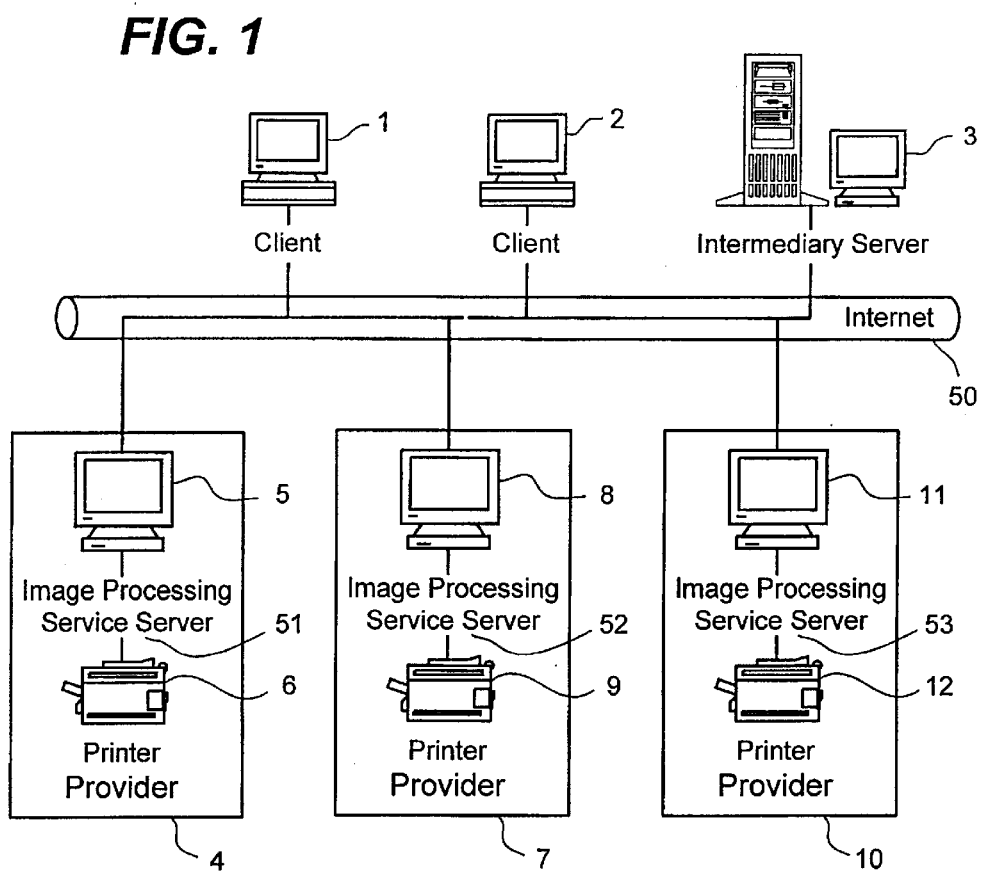
FIG. 1 shows an overall structure of an image processing service intermediary system in accordance with a first embodiment of the present invention.

DESCRIPTION OF THE PREFERRED
EMBODIMENT

Preferred embodiments of the present invention are described in detail below with reference to the accompanying drawings. It is noted that the scope of the invention is not construed to be limited to the measurements, materials, shapes and relative locations of component parts described in the embodiments unless specific descriptions are specifically made.

Also, in the drawings described below, units similar to units that have already been described in preceding drawings are referred to by the same numbers. Also, the description to be made below for an image processing service intermediary system in accordance with each embodiment of the present invention also serves to describe an image processing server, server, image processing service intermediary method, image processing service intermediary program and computer readable storage medium that stores an image processing service intermediary program in accordance with the present invention.

(First Embodiment)

First, an image processing service intermediary system in accordance with a first embodiment of the present invention is described below with reference to FIG. 1 through FIG. 3.

FIG. 1 shows an overall structure of the image processing service intermediary system in accordance with the first embodiment of the present invention.

In FIG. 1, reference numbers 1 and 2 denote clients that are used by users of the present system, and reference number 3 denotes an intermediary server that is a server of the present invention, which performs an intermediary process between users of the image processing service and image processing service providers.

Also, reference number 4 denotes a first provider who provides an image processing service, reference number 5 denotes an image processing service server of the first provider who provides the image processing service, which is an image processing server in accordance with the present invention, and reference number 6 denotes a printer as an image processing apparatus in accordance with the present invention of the first provider who provides the image processing service.

Also, reference number 7 denotes a second provider who provides an image processing service, reference number 8 denotes an image processing service server of the second provider who provides the image processing service, which is an image processing server in accordance with the present invention, and reference number 9 denotes a printer as an image processing apparatus in accordance with the present invention of the second provider who provides the image processing service.

Also, reference number 10 denotes a third provider who provides an image processing service, reference number 11 denotes an image processing service server of the third provider who provides the image processing service, which is an image processing server in accordance with the present invention, and reference number 12 denotes a printer as an image processing apparatus in accordance with the present invention of the third provider who provides the image processing service.

Also, reference number 50 denotes the Internet that is a network that mutually connects the clients 1 and 2, the intermediary server 3, and the image processing service servers 5, 8 and 11.

Also, reference numbers 51, 52 and 53 denote printer interface cables that connect the image processing service servers and the corresponding respective printers.

It is noted that, in the example of the system shown in FIG. 1, the description is made with the number of the clients being two, the number of the intermediary server being one, and the number of each of the image processing service servers and the printers being three. However, the present invention is not limited to this example, and the number of clients, intermediary servers, image processing service servers and printers may be any number which is one or greater.

Also, the present invention is described below on the assumption that there are, in principle, two or more service providers who provide image processing service. However, if the present system is used as a system that merely calculates the image processing cost, the number of the service providers who provide image processing service can be one.

Next, an internal structure of the intermediary server that is used in the above image processing service intermediary system in accordance with the first embodiment is described with reference to FIG. 2. FIG. 2 shows an internal block diagram of the intermediary server 3 that is used in the image processing service intermediary system in accordance with the first embodiment shown in FIG. 1.

Figure 2:
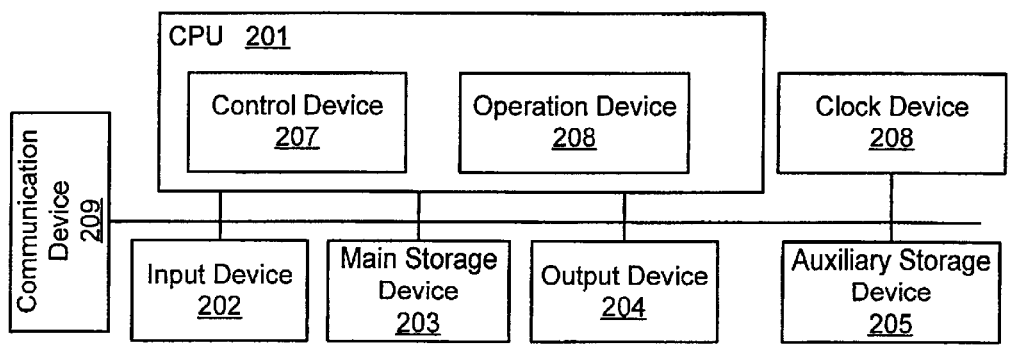
FIG. 2 shows an internal block diagram of an intermediary server 3 that is used in the image processing service intermediary system in accordance with the first embodiment of the present invention shown in FIG. 1.
Figure 3:
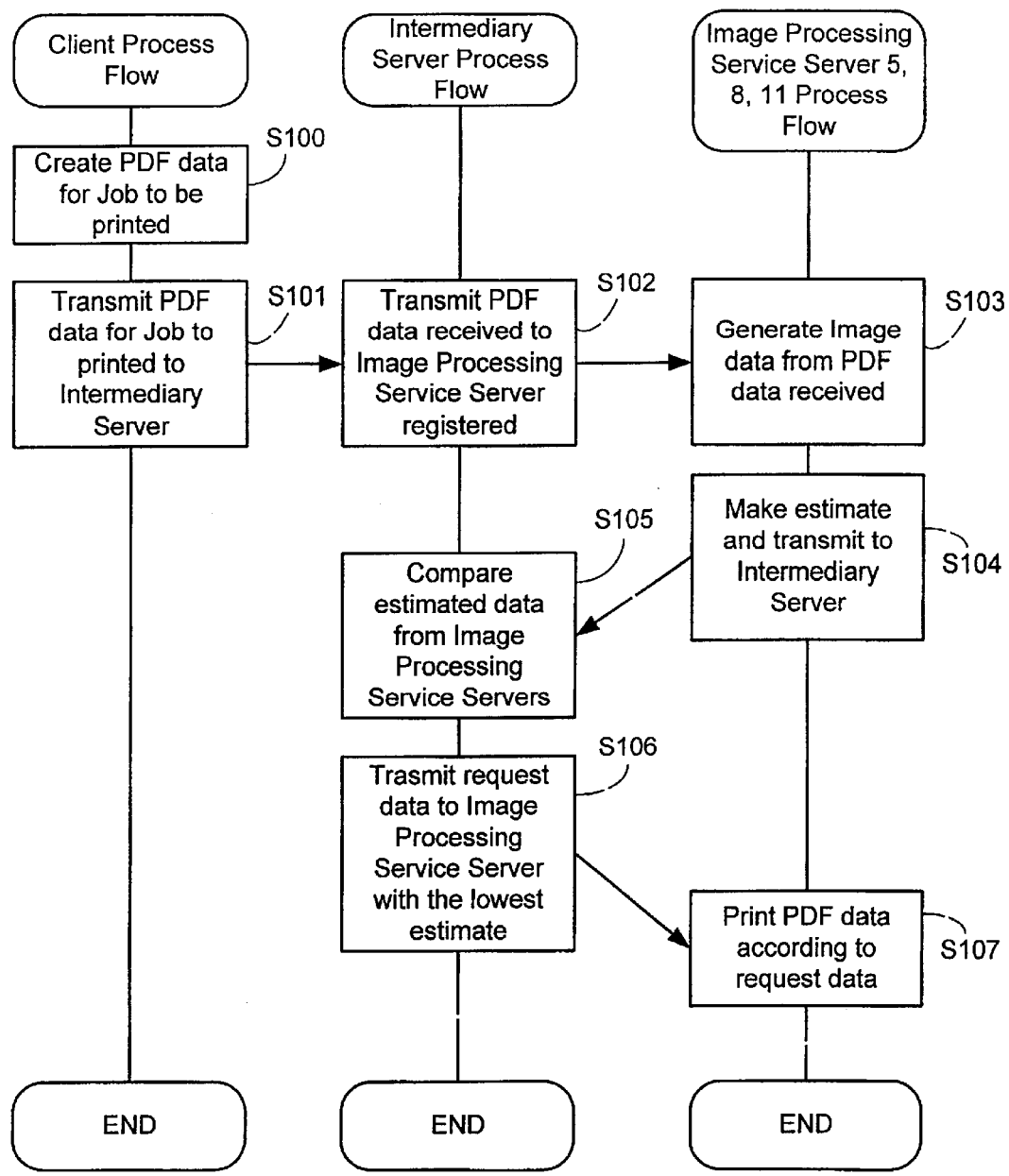
FIG. 3 shows a flow chart of an operation of the image processing service intermediary system in accordance with the first embodiment of the present invention shown in FIG. 1.

As shown in FIG. 2, the intermediary server 3 is formed from a CPU (Central Processing Unit) 201, an input device 202, a main storage device 203, an output device 204, an auxiliary storage device 205, a clock device 206 and a communication device 209.

The CPU 201 is a unit that is synonymous with a processing apparatus, which is formed from a control device 207 that transmits instructions to various devices within the system and controls their operations, and an operation device 208 that is a core section of the server and executes an operation process for digital data.

Here, the CPU 201 operates in cooperation with programs stored in the main storage device 203 and the auxiliary storage device 205 to function as a determination means, a server receiving means and a server transmission means.

Also, when the internal block diagram shown in FIG. 2 is regarded as an internal block diagram of the image processing service server, the CPU 201 operates in cooperation with programs stored in the main storage device 203 and the auxiliary storage device 205 to function as a reception means, an image data generation means, an image processing condition generation means, a calculation means, a transmission means and a rate calculation means.

Also, when the internal block diagram shown in FIG. 2 is regarded as an internal block diagram of the client, the CPU 201 operates in cooperation with programs stored in the main storage device 203 and the auxiliary storage device 205 to function as a print data generation means, a print condition generation means, and a print data and condition transmission means.

The control device 207 reads data input from the input device 202 or given process (for example, program and software) into the main storage device 203 according to the clock timing generated by the clock device 206, and transmits instructions based on the read content to the operation device 208 to perform an operation process. The result of the operation process is transmitted to the internal devices such as the main storage device 203, the output device 204 and the auxiliary storage device 205 and external devices based on the control of the control device 207.

The input device 202 is a unit used for inputting various data, and may be, for example, a keyboard, a mouse, a pointing device, a touch panel, a mouse pad, a CCD camera, a card reader, a paper tape reader device, a magnetic tape device and the like.

The main storage device 203 is a unit that is synonymous with a memory, which indicates any and all addressable memory spaces that are used for executing instructions in the processing apparatus and internal memory apparatuses. The main storage device 203 is formed mainly from semiconductor memory elements, stores and retains programs and data input therein, and reads out data that is stored and retained therein to, for example, a register according to instructions provided by the control apparatus 207.

Also, the semiconductor memory elements that form the main storage device 203 include RAMs (Random Access Memories) and ROMs (Read Only Memories).

The output device 204 is a unit that outputs operation results or the like of the operation device 208, and corresponds to a display device such as a CRT, a plasma display panel and a liquid crystal display, an image processing apparatus such as a printer, and a voice output device or the like.

Also, the auxiliary memory device 205 is a unit that supplements the memory capacity of the main storage device 203, functions as a storage means, and corresponds to, for example, a floppy disk, a hard disk, a CDROM, a CD-R, a CD-RW, an MO or the like that is formed from a magnetic disk device, an optical disk device, a semiconductor disk device or the like.

The communication device 209 is a device that performs communication with external networks, and performs transmission and reception of data, digital-analog conversion of data, or the like, when required according to a network that is connected thereto.

Here, an address bus or a data bus mutually connects the devices described above.

Also, the number of each of the main storage device 203 and the auxiliary device 205 is not limited to one, but may be any number. The greater the number of the main storage devices 203 and the auxiliary storage devices, the resistance of the server to obstacles will improve.

It is noted that a variety of programs that make the server of the present invention execute processes is stored (recoded) in at least one of the main storage device 203 and the auxiliary storage device 205.

Accordingly, a computer readable recording medium that records programs in accordance with the present invention, which make the server execute processes, corresponds to at least one of the main storage device 203 and the auxiliary storage device 205. It is noted that, besides the above, a CD-ROM, an FD, a CD-R, a CD-RW or the like can also be used as a computer readable recording medium for storing programs in accordance with the present invention that make the server execute processes.

It is noted that the computer readable recording medium described in accordance with the present invention and the present embodiment also includes a recording medium that is readable by the server or a recording medium that is readable by the client.

A program that is applied to the system, in accordance with the present invention, corresponds to each of the programs that are applied to the computers, servers, databases and devices, an appropriate combination of the programs applied thereto, or the entirety of the programs applied thereto.

In other words, a computer readable recording medium that stores a program in accordance with the present invention may be equipped with a recording medium that records all steps in one device even when the program that realizes the process of the system is composed of multiple steps. Alternatively, an appropriate one of the devices that comprises the system may be equipped with a recording medium that records an appropriate part of the multiple steps, such that the program that realizes the process of the system as a whole may be composed by equipping each appropriate device with a recording medium that records an appropriate part of the steps among the multiple steps.

Also, in the description made above, only the internal structure of the intermediary server 3 shown in FIG. 1 is described. However, each of the clients 1 and 2, and the image processing service servers 5, 8 and 11 shown in FIG. 1 has an internal structure similar to the structure shown in FIG. 2, and a similar description can be established.

Next, an operation of the image processing service intermediary system shown in FIG. 1 in accordance with the first embodiment of the present invention is described with reference to FIG. 3. FIG. 3 shows a flow chart of an operation of the image processing service intermediary system shown in FIG. 1 in accordance with the first embodiment.

Also, an operation of the intermediary server shown in this flow chart is realized by the CPU 201 shown in FIG. 2 cooperatively working with the programs that are stored in the main storage device 203 and the auxiliary storage device 205.

Also, operations of the clients and the image processing service servers shown in this flow chart are realized by the CPU cooperatively working with the programs that are stored in the main storage device and the auxiliary storage device.

Also, the client 1, the client 2, the image processing service server 5 of a provider 4, the image processing service server 8 of a provider 7, and the image processing service server 11 of a provider 10 are respectively registered in the intermediary server 3, such that the intermediary server 3 is placed in a usable state.

Also, in the description below, the user of the system uses the client 1 as a terminal that is utilized by her.

First, the client 1 creates a document to be printed by an application that is operated on the client 1 according to an instruction by the user. Here, the "printing" used in the present specification and the drawings indicates an example of an image processing operation.

An ordinary desktop publishing application is used for creating the document (Step S100).

The client 1 generates Portable Document Format (hereafter simply referred to as PDF) data as print data in accordance with the present invention from the document that is created in Step S100.

PDF data is a document format whose specification is designed by Adobe Systems Incorporated (Registered Trademark), and is data that is automatically generated by printing the document from the application into a PDF file generation printer driver.

PDF data is data that can be directly printed, without an intervention of a printer driver, by a PostScript (Registered Trademark) Level 3 printer that is developed by Adobe. Also, the client 1 creates printing condition data here.

The printing condition data includes the size of paper, the type of paper, whether or not both surfaces are printed, post-processing such as binding and stapling after printing, delivery methods after printing, the number of prints and the like.

The user transmits the PDF data and the printing condition data generated to the intermediary server 3 through the Internet 50 (Step S101).

The intermediary server 3, which receives the PDF data and the printing condition data that are transmitted from the client 1 through the Internet 50, transmits the received PDF data and the printing condition data to the image processing service servers 5, 8 and 11 of the respective registered providers 4, 7 and 10 through the Internet 50 (Step S102).

Each of the image processing service servers 5, 8 and 11 of the respective providers 4, 7 and 10 receive the PDF data and the printing condition data that are transmitted from the intermediary server 3, and generates image data to be actually printed from the PDF data.

Image data is raster image data that is used when images are formed, and the generated image data is retained (stored) in the main storage devices or the auxiliary storage devices in the image processing service servers 5, 8 and 11.

Each of the image processing service servers generates image processing conditions such as the number of pages, the amount of toner consumption and the like from the image data retained therein by an application that is operated in each of the image processing service servers.

Then, each of the image processing service servers calculates, based on the printing condition data and the generated image processing conditions, an image processing cost (hereinafter referred to as an "estimate") including the cost of consumables that are used when the image data is printed.

The number of pages can be readily calculated by the page number of the image data, and with respect to the amount of toner consumption, the amount of consumption of each color toner of the image data can be calculated by referring to a relation table between image density and toner consumption.

Also, if two-sided printing is designated as a printing condition, the number of papers that are used for printing is calculated as the number of papers for the two-sided printing, the printing cost is calculated based on the data including the size of paper, the type of paper, the binding or stapling process after printing, the method of delivery after printing, and the number of prints, and a profit is added thereto to calculate an estimate.

Also, when an image processing cost is calculated based on the image data and other expenses required for printing under the print data and the printing conditions, a determination is made as to a rate between color and black and white in each of the pages of the printed matter, and the cost for color printing and the cost for black and white printing are discriminated one from the other based on the determination result to thereby calculate an estimate of the cost.

The image processing service servers 5, 8 and 11, which calculate the estimates, transmit the calculated estimates to the intermediary server 3 (Step S104).

The intermediary server 3, which receives the estimate from each of the image processing service servers 5, 8 and 11, selects a provider who presented the lowest estimate among the received estimates. Here, let us assume that the image processing cost sent from the image processing service server 5 of the provider 4 is selected (Step S105).

The intermediary server 3 requests the image processing service server 5 of the provider 4 selected in Step S105 to execute the image processing service (Step S106).

The image processing service server 5, which receives the request from the intermediary server 3, performs printing by the printer 6 using the image data generated in Step S103 based on the printing condition data received in Step S102.

In other words, the image processing service server retains the image data that is used for the calculation of the cost at least until a requester of the image processing service is determined, and performs printing using the retained image data when the service is requested.

Also, a notification is sent to the image processing service servers of the providers 7 and 10 that are not selected in Step S105 specifying that they are not selected. The image processing service servers, which receive the notification, erase the retained image data. This eliminates an inconvenience in which the image processing service servers that are not selected have to retain the image data used for the calculation of the cost indefinitely.

Then, the image processing service server 5 prints PDF data according to request data and performs a delivery process for the print result (issuing of invoices or the like) (Step S107).

With the procedure described above, the user can request an image processing service from the most inexpensive image processing service provider.

In this manner, in accordance with the present embodiment, since a service provider who undertakes printing service is determined by bidding, the user side creates PDF data (print data), and the provider side (the intermediary server side in the second embodiment) creates image data.

This is because the user needs to create data that can be printed at an image processing apparatus that is owned by a service provider, no matter which one of the service providers makes a successful bid since the image processing apparatuses (i.e., printers 6, 9 and 12) used by the respective service providers are different from one another.

If the user side were to generate image data, there may be occasions in which the image data cannot be printed by an image processing apparatus owned by a service provider who makes a successful bid.

For example, if a service provider who has made a successful bid owns an image processing apparatus with a resolution of 1200 dpi, and the user generates image data with a resolution of 720 dpi, this cannot be printed.

However, when the user creates PDF data like the one in the case of the present embodiment, the service provider can generate image data that can be printed by an image processing apparatus owned by the service provider from the PDF data, and accordingly the data can be printed by any of the image processing apparatuses owned by the service providers.

For this reason, in accordance with the present embodiment, print data (PDF data) is created at the user side, and image data (raster image data) is created at the server side or the provider side.

Also, the present embodiment provides effects in which, first, images can be formed at a price advantageous (at a low price) to the user, and second, the price for forming images to be proposed to the user can be accurately made.

In order to attain the second effect, the present invention uses the "image data".

This is because the consumption of supplies, and toner in particular, to be used mainly for printing influence the image processing cost.

In other words, even when the same colors are printed, the amount of toner consumption and the cost per the amount of toner consumption may vary depending on the image processing apparatuses.

PDF data is data for a wide use, and can be printed by any image processing apparatuses, and the toner consumption by an image processing apparatus that actually prints cannot be accurately estimated from such data.

On the other hand, if image data that is generated from PDF data and used for actual printing is available, a density value of each of the pixels of the image at the time of printing by an image processing apparatus can be accurately calculated, and how much toner is consumed can be estimated based on the density value.

Accordingly, in accordance with the present embodiment, image data that is used by an image processing apparatus is used for calculating an image processing cost.

The present embodiment provides the following effects. Since image data that is used to estimate the cost can be reused for an actual printing, a process for generating image data from PDF data is conducted only once, such that the image processing service server can be effectively utilized.

Also, because print data is provided in a PDF file, the print data, which does not depend on the characteristic of an image processing apparatus that actually performs printing, can be used to calculate an image processing cost by an image processing apparatus that is used by the image processing service provider.

Also, since the image processing service server itself calculates the image processing cost based on the printing condition data and the image processing conditions, a more accurate image processing cost can be calculated.

In other words, since an image processing cost calculated includes costs of consumables that are actually used at the time of printing the image data that is generated based on the print data, the image processing service provider can readily calculate the costs of the consumables such as toner and ink whose consumption amounts vary substantially depending on actual print data.

Also, because most of the processes are performed at each of the service providers, and the intermediary server 3 has to take charge of only the data transfer and intermediary process, there will be fewer possibilities to encounter problems even when a server having a low processing capability is used as the intermediary server 3.

Also, each of the image processing service providers can freely decide a method for making an estimate, which results in a higher degree of freedom.

Also, a determination is made as to a rate between color and black and white in each of the pages of the printed matter, and the cost for color printing and the cost for black and white printing are discriminated one from the other based on the determination result to thereby calculate a cost estimate. As a result, the image processing service provider can readily calculate the cost that may incur when the black and white portion is printed by a white and black image processing apparatus that forms images at a lower cost, and the color portion is printed by a color image processing apparatus.

Also, the image processing service server retains the image data that is used to calculate the cost at least until a requester of the image processing service is determined, and performs printing using the retained image data when the service is requested. As a result, the requested image processing service provider does not have to generate image data again from the print data, such that the generated image data can be efficiently used.

Also, in accordance with the present embodiment, because a step of generating image data from print data is always included at the time when the cost is estimated, an error that may be contained in the print data can be discovered early and a correction can be made quickly.

Also, in addition, because image data that fits to the environment of each of the image processing service providers is generated at the time when the cost is estimated, print data and print conditions that cannot be processed by equipment owned by each of the image processing service providers can be detected in advance.

Figure 4:
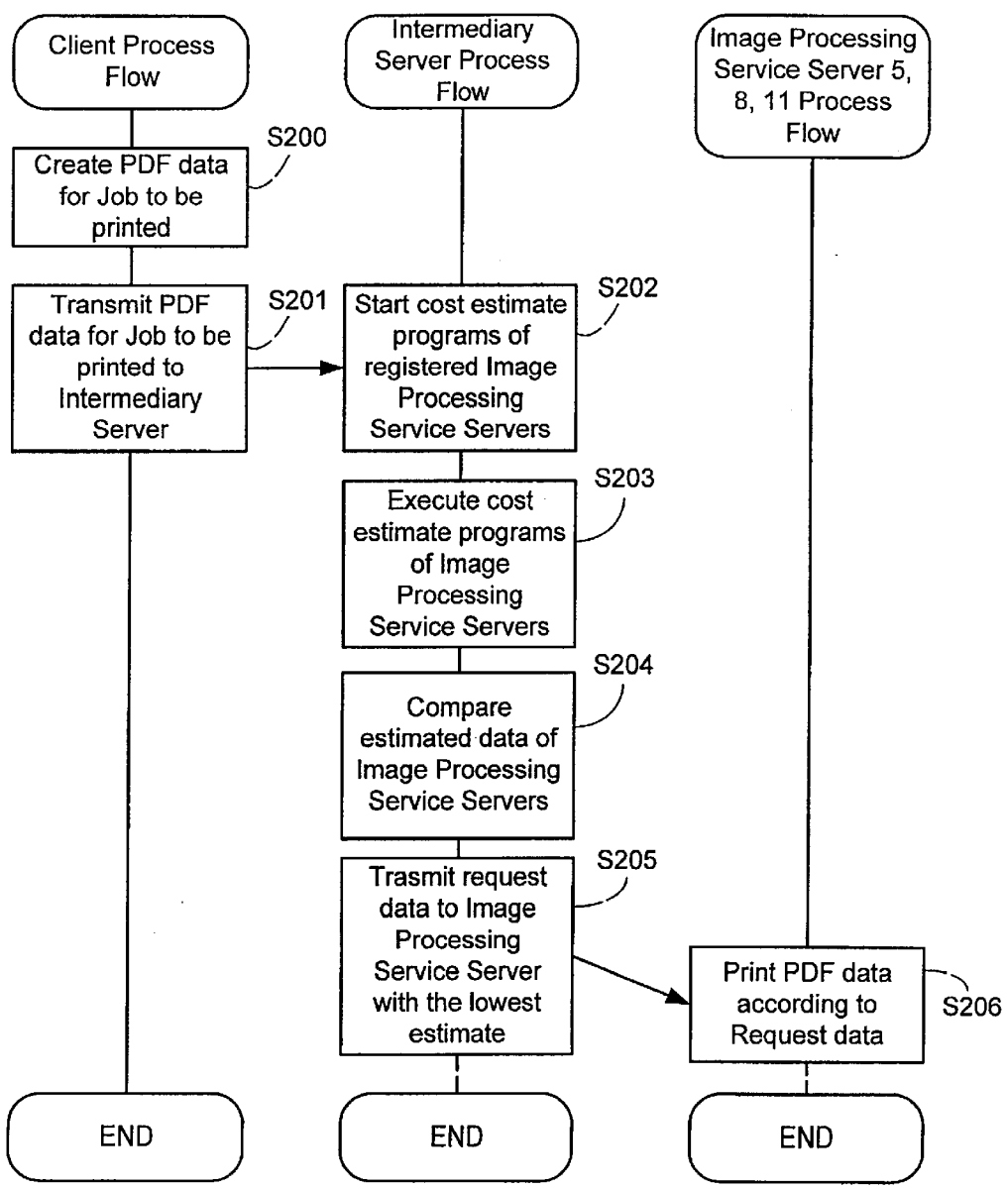
FIG. 4 shows a flow chart of an operation of an image processing service intermediary system in accordance with a second embodiment of the present invention.

Next, an image processing service intermediary system in accordance with a second embodiment of the present invention is described with reference to FIG. 4. FIG. 4 shows a flow chart of operations of the image processing service intermediary system in accordance with the second embodiment of the present invention.

Here, the overall structure of the image processing service intermediary system in accordance with the second embodiment of the present invention is the same as the example shown in FIG. 1 in accordance with the first embodiment described above. Also, the internal structure of each of the clients, the intermediary server and each of the image processing service servers is the same as the internal structure of each of the corresponding devices described in the first embodiment.

The CPU 201 shown in FIG. 2 works in cooperation with the programs stored in the main storage device 203 and the auxiliary storage device 205 to function as a determination means, a server reception means, a server transmission means, an image data generation means, an image processing condition generation means, a calculation means, and a rate calculation means.

In the present embodiment in the case of two users of image processing service and three providers, a method for printing a printed matter at the lowest cost by the user 1 is described with reference to FIG. 1 and FIG. 4.

Also, clients and image processing service servers of the corresponding respective user 1, user 2, provider 4, provider 7 and provider 10 are registered in the intermediary server 3, such that the intermediary server 3 is in a usable state.

Also, the intermediary server 3 has image processing service cost estimate programs in an operational state that are provided by the respective providers 4, 7 and 10 and suit to the characteristics of printers respectively owned by the providers 4, 7 and 10.

Also, operation of the intermediary server 3 indicated in the flow chart shown in FIG. 4 are realized by operations of the CPU 201 shown in FIG. 2 in cooperation with the programs stored in the main storage device 203 and the auxiliary storage device 205. Also, operations of the clients are realized by operations of the internal CPUs of the respective clients in cooperation with the programs stored in the respective main storage devices and auxiliary storage devices.

First, the client 1 creates a document to be printed by an application that is operated on the computer owned by the client 1 according to an instruction by the user.

An ordinary desktop publishing application is used for creating the document (Step S200).

The client 1 generates PDF data from the document created in Step S200.

The client 1 also generates printing condition data at this time according to an instruction by the user.

The printing condition data includes paper sizes, types of paper, whether or not both surfaces are printed, post-processing such as binding and stapling after printing, delivery methods after printing, the number of prints and the like.

The client 1 transmits the PDF data and the printing condition data created to the intermediary server 3 through the Internet 50 (Step S201).

The intermediary server 3, which receives the PDF data and the printing condition data that are transmitted from the client 1 through the Internet 50, starts the image processing service cost estimate programs with the received PDF data and the printing condition data as inputs for the image processing service cost estimate programs of the respective registered providers 4, 7 and 10 (Step S202).

Each of the image processing service cost estimate programs that operates on the intermediary server 3 generates, from the PDF data, image data that is in accordance with the characteristic of the image processing apparatus owned by each of the respective providers.

Then, each of the image processing service cost estimate programs that operates on the intermediary server 3 generates image processing conditions such as the number of pages, the amount of toner consumption and the like based on the image data.

Then, each of the image processing service cost estimate programs that operate on the intermediary server 3 calculates a cost for the image processing service (an image processing cost) according to the printing conditions (Step S203).

Here, the "image data in accordance with the characteristic of the image processing apparatus" may include, as an example, image data that is in accordance with the color characteristic of the image processing apparatus, because image data according to the resolution of each of the image processing apparatuses, and the consumption amount of toner that is used to express particular colors by each of the image processing apparatuses may be different from one another.

Here, the color characteristic of the image processing apparatus is a characteristic in which, for printing one pixel of red color, for example, magenta 100% and yellow 90% are used by one image processing apparatus, or magenta 95% and yellow 95% are used by another image processing apparatus. In this manner, image data that needs to be generated may differ from one image processing apparatus from the other.

The intermediary server 3 compares the cost estimates calculated by the respective image processing service cost estimate programs in Step S203 (Step S204).

The intermediary server 3 selects a provider with the lowest cost estimate from the comparison result provided in Step S204. Here, let us assume that the provider 4 is selected.

The PDF data and the printing conditions received in Step S202 are transmitted to the image processing service server 5 of the selected provider 4, and a request for the image processing service is made (Step S205).

Here, the image data that is generated by the intermediary server 3 for calculating the image processing cost may be transmitted as data to be transmitted to the image processing service server 5, instead of the PDF data. In this case, the processing load at the image processing service server 5 is alleviated.

The provider 4, who receives the request from the intermediary server 3, generates image data by the image processing service server 5 (when print data is received), performs printing by the printer 6 based on the printing conditions and the image data, and executes a delivery process of the print result for the user (Step S206).

On the other hand, the image processing service server prints PDF data according to a print request. (Step S206).

By the procedure described above, the user can request an image processing service from the most inexpensive image processing service provider.

In this manner, the present embodiment can obtain effects similar to those obtained by the image processing service intermediary system in accordance with the first embodiment of the present invention described above. In addition, costs are estimated in the intermediary server 3, such that the print data is not disclosed to a plurality of image processing service providers, which provides security when highly confidential printed matter is created.

Also, since any equipment on the side of the image processing service provider is used until an image processing service is actually requested, the equipment on the side of the image processing service provider can be effectively utilized.

Here, in each of the embodiments described above, the Internet is considered as a network that mutually connects the clients, the intermediary server and the image processing service servers. However, the network used in the present invention is not limited to the Internet, and a network of another protocol may be used instead or used in combination.

Also, it does not matter whether the network is wired or wireless. Furthermore, as the clients, hand-carry telephones, PDAs (personal digital assistants), digital home electric appliances such as net-work capable TVs and the like can be used or used in combination, in addition to personal computers.

Also, in each of the embodiments described above, a PDF file is used as print data. However, print data that is used in the present invention is not limited to files (data) in PDF format, and any data format may be used if data can be widely used, and can be printed by any image processing apparatuses.

As described above, the present invention enables the user of an image processing service to readily select and use the most inexpensive image processing service provider.

What is claimed is:

1. A data processing apparatus adapted for communicating with a client and a plurality of image processing apparatuses through a network, comprising:

a storage unit, adapted for storing data representing characteristics of each of the plurality of image processing apparatuses;

a reception unit, adapted for receiving print data through the network, the print data being in a format non-specific to the plurality of image processing apparatuses;

a generating unit, adapted for generating a plurality of image data from the print data based on characteristics of the plurality of image processing apparatuses, each image data being specific to one of the plurality of image processing apparatuses, and for generating, based on the plurality of image data, cost estimate data representing a cost required for producing an image from the print data by each image processing apparatus; and a selector unit, adapted for selecting one of the plurality of image processing apparatuses based on the cost estimate data.

2. A data processing apparatus according to claim 1, further comprising a transmitter unit, adapted for transmitting the print data and an instruction to execute printing of the print data to the selected image processing apparatus.

3. A data processing apparatus according to claim 1, wherein the selector unit selects an image processing apparatus with a lowest cost.

4. A data processing apparatus according to claim 1, wherein the print data includes data in portable document format (PDF).

5. A data processing apparatus according to claim 1, wherein the selector unit uses, as a condition for selecting an image processing apparatus, printing condition data associated with the print data received through the network including at least one of a size of paper, a type of paper, whether or not a two-sided printing is conducted, whether or not a binding process is conducted after printing, whether or not a stapling process is conducted after printing, a method of delivery after printing, and a number of prints.

6. A data processing apparatus according to claim 1, wherein the selector unit uses, as a condition for selecting an image processing apparatus, at least one of a number of pages of images and a consumption amount of consumables.

7. A data processing apparatus according to claim 1, wherein the selector unit uses, as a condition for selecting an image processing apparatus, a rate of black and white image and color image to be formed.

8. A method for processing data in a data processing apparatus in communication with a plurality of image processing apparatuses through a network, comprising:

storing data representing characteristics of each of the plurality of image processing apparatuses;

receiving print data through the network, the print data being in a format non-specific to the plurality of image processing apparatuses;

generating a plurality of image data from the print data based on characteristics of the plurality of image processing apparatuses, each image data being specific to one of the plurality of image processing apparatuses;

generating, based on the plurality of image data, cost estimate data representing a cost required for producing an image from the print data by each image processing apparatus; and selecting one of the plurality of image processing apparatuses based on the cost estimate data.

9. A method according to claim 8, further comprising transmitting to the selected image processing apparatus the print data and an instruction to execute printing of the print data.

10. A method according to claim 8, wherein the selecting step selects an image processing apparatus with a lowest cost.

11. A method according to claim 8, wherein the print data includes data in portable document format (PDF).

12. A method according to claim 8, wherein the selecting step uses, as a condition for selecting an image processing apparatus, printing condition data associated with the print data received through the network including at least one of a size of paper, a type of paper, whether or not a two-sided printing is conducted, whether or not a binding process is conducted after printing, whether or not a stapling process is conducted after printing, a method of delivery after printing, and a number of prints.

13. A method according to claim 8, wherein the selecting step uses, as a condition for selecting an image processing apparatus, at least one of a number of pages of images and a consumption amount of consumables.

14. A method according to claim 8, wherein the selecting step uses, as a condition for selecting an image processing apparatus, a rate of black and white image and color image to be formed.

15. A computer program executed by a computer of a data processing apparatus adapted for communicating with a plurality of image processing apparatuses through a network, comprising:

program code for receiving print data through the network, the print data being in a format non-specific to the plurality of image processing apparatuses;

program code for generating a plurality of image data from the print data based on stored data representing characteristics of the plurality of image processing apparatuses, each image data being specific to one of the plurality of image processing apparatuses;

program code for generating, based on the plurality of image data, cost estimate data representing a cost required for producing an image from the print data by each image processing apparatus; and program code for selecting one of the plurality of image processing apparatuses based on the cost estimate data.

16. A computer program according to claim 15, further comprising:

program code for transmitting to the selected image processing apparatus the print data and an instruction to execute printing of the print data.

17. A computer readable memory that stores the computer program recited in claim 16.

18. A computer readable memory that stores the computer program recited in claim 15.

19. A computer program executed by a computer of a data processing apparatus adapted for communicating with a plurality of image processing apparatuses through a network, comprising:

program code for supplying print data, the print data being in a format non-specific to the plurality of image processing apparatuses;

program code for generating a plurality of image data from the print data based on stored data representing characteristics of the plurality of image processing apparatuses, each of the image data being suitable for one of the plurality of image processing apparatuses;

program code for generating, based on the plurality of image data, cost estimate data representing a cost required for producing an image from the print data by each image processing apparatus; and program code for selecting one of the plurality of image processing apparatuses based on the cost estimate data.

20. A computer program according to claim 19, further comprising:

program for transmitting to the selected image processing apparatus the print data and an instruction to execute printing of the print data.

21. A computer readable memory that stores the computer program recited in claim 19.

22. A method for processing data in a data processing apparatus in communication with a plurality of image processing apparatuses through a network, comprising the steps of:

storing data representing characteristics of each of the plurality of image processing apparatuses;

supplying print data, the print data being in a format non-specific to the plurality of image processing apparatuses;

generating a plurality of image data from the print data based on characteristics of the plurality of image processing apparatuses, each of the image data being suitable for one of the plurality of image processing apparatuses;

generating, based on the plurality of image data, cost estimate data representing a cost required for producing an image from the print data by each image processing apparatus; and selecting one of the plurality of image processing apparatuses based on the cost estimate data.

23. A method according to claim 22, further comprising transmitting to the selected image processing apparatus the print data and an instruction to execute printing of the print data.

24. A method according to claim 22, wherein the selecting step includes selecting an image processing apparatus with a lowest cost.

25. A method according to claim 22, wherein the print data includes data in portable document format (PDF).

26. A method according to claim 22, wherein the selecting step uses, as a condition for selecting an image processing apparatus, printing condition data associated with the print data received through the network including at least one of a size of paper, a type of paper, whether or not a two-sided printing is conducted, whether or not a binding process is conducted after printing, whether or not a stapling process is conducted after printing, a method of delivery after printing, and a number of prints.

* * * * *